United States Patent
Broberg et al.

(10) Patent No.: US 9,638,488 B1
(45) Date of Patent: May 2, 2017

(54) ARCHERY BOW SUPPORT

(71) Applicant: Du-Bro Products, Inc., Wauconda, IL (US)

(72) Inventors: James E. Broberg, Wauconda, IL (US); David D. Gray, Lake Villa, IL (US)

(73) Assignee: Du-Bro Products, Inc., Wauconda, IL (US)

( * ) Notice: Subject to any disclaimer, the term of this patent is extended or adjusted under 35 U.S.C. 154(b) by 0 days.

(21) Appl. No.: 15/292,728

(22) Filed: Oct. 13, 2016

(51) Int. Cl.
*F41B 5/14* (2006.01)
*F16M 11/04* (2006.01)
*F16M 11/20* (2006.01)
*F16M 11/24* (2006.01)
*F16B 2/12* (2006.01)
*F16M 11/26* (2006.01)
*F41A 23/10* (2006.01)
*F41A 23/08* (2006.01)

(52) U.S. Cl.
CPC .............. *F41B 5/1453* (2013.01); *F16B 2/12* (2013.01); *F16M 11/04* (2013.01); *F16M 11/24* (2013.01); *F16M 11/26* (2013.01); *F41A 23/08* (2013.01); *F41A 23/10* (2013.01)

(58) Field of Classification Search
CPC ......... F41B 5/1453; F16B 2/12; F16M 11/04; F16M 11/24; F16M 11/26; F16M 11/041; F41A 23/08; F41A 23/10
USPC ...... 248/166, 171, 440.1, 316.1, 127; 42/94; 81/348, 424.5; 269/91
See application file for complete search history.

(56) References Cited

U.S. PATENT DOCUMENTS

| | | | | |
|---|---|---|---|---|
| 1,586,297 A * | 5/1926 | Du Bois | ................... | B25B 7/12 81/348 |
| 3,235,997 A * | 2/1966 | Stoner | ..................... | F41A 23/08 42/94 |
| 3,804,132 A | 4/1974 | Mann | | |
| 4,219,919 A * | 9/1980 | Fischbein | .............. | A44C 5/185 81/424.5 |
| 5,165,155 A | 11/1992 | Adams | | |
| 5,711,103 A * | 1/1998 | Keng | ..................... | F41A 23/10 42/94 |
| 6,663,071 B2 * | 12/2003 | Peterson | ................ | F16M 11/26 248/440.1 |
| 6,695,267 B2 | 2/2004 | Liao | | |
| D491,434 S | 6/2004 | Noniewicz | | |
| D508,640 S | 8/2005 | Ping | | |
| 7,032,494 B2 * | 4/2006 | Wygant | ................... | F41A 23/08 248/171 |
| 7,909,301 B2 * | 3/2011 | Faifer | .................. | F16M 11/041 248/166 |
| 8,087,137 B2 * | 1/2012 | Wang | ..................... | A41H 37/00 269/91 |
| 9,089,978 B2 * | 7/2015 | Carmichael | ............. | B26B 13/26 |
| 2005/0188597 A1 | 9/2005 | Keng et al. | | |
| 2011/0138973 A1 | 6/2011 | Wang | | |

* cited by examiner

*Primary Examiner* — Tan Le
(74) *Attorney, Agent, or Firm* — Mathew R. P. Perrone, Jr.; Joseph Whang

(57) ABSTRACT

An archery bow support has adjustable or movable jaws and adjustable legs to a permit a releasable attachment to a plurality of different types of bows for positioning the bow during a downtime or brief period of non use during a period of heavy use for the bow, to assist the archer with a rest period.

8 Claims, 9 Drawing Sheets

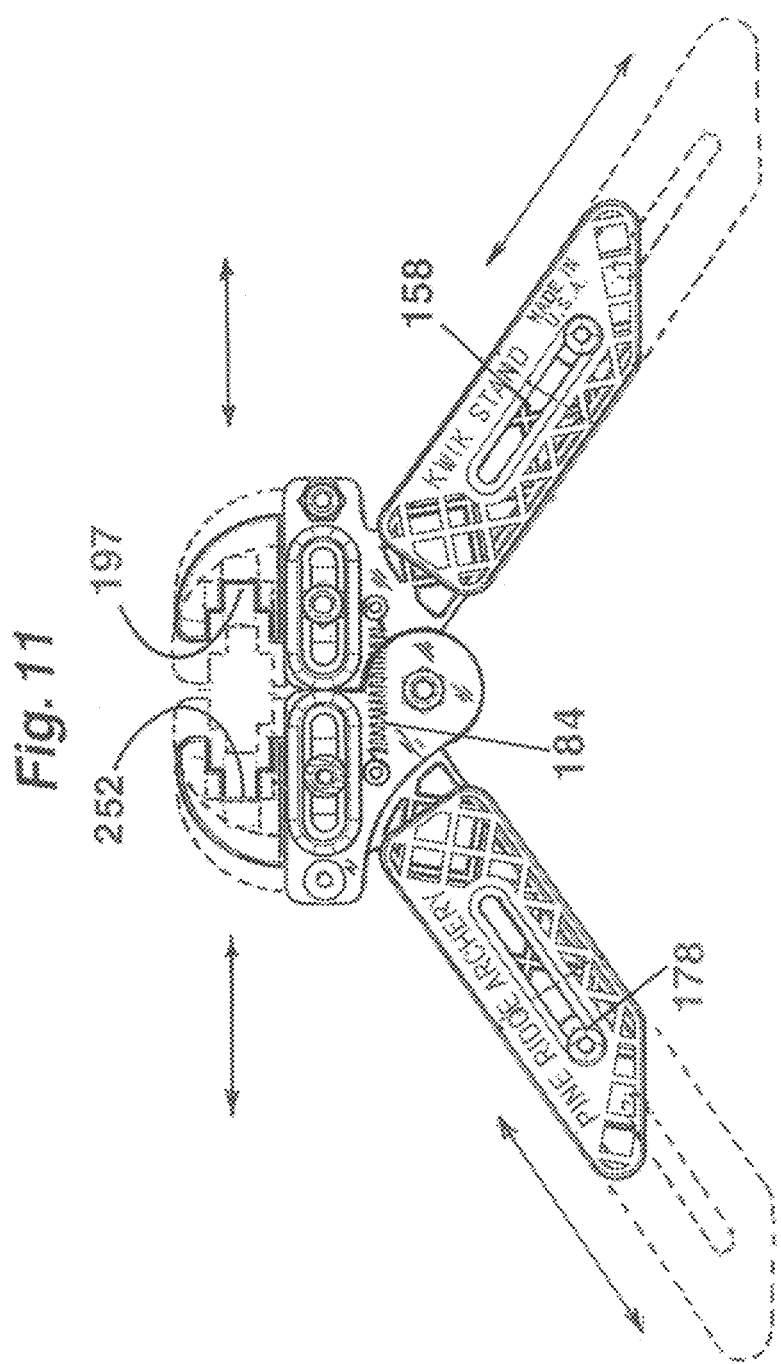

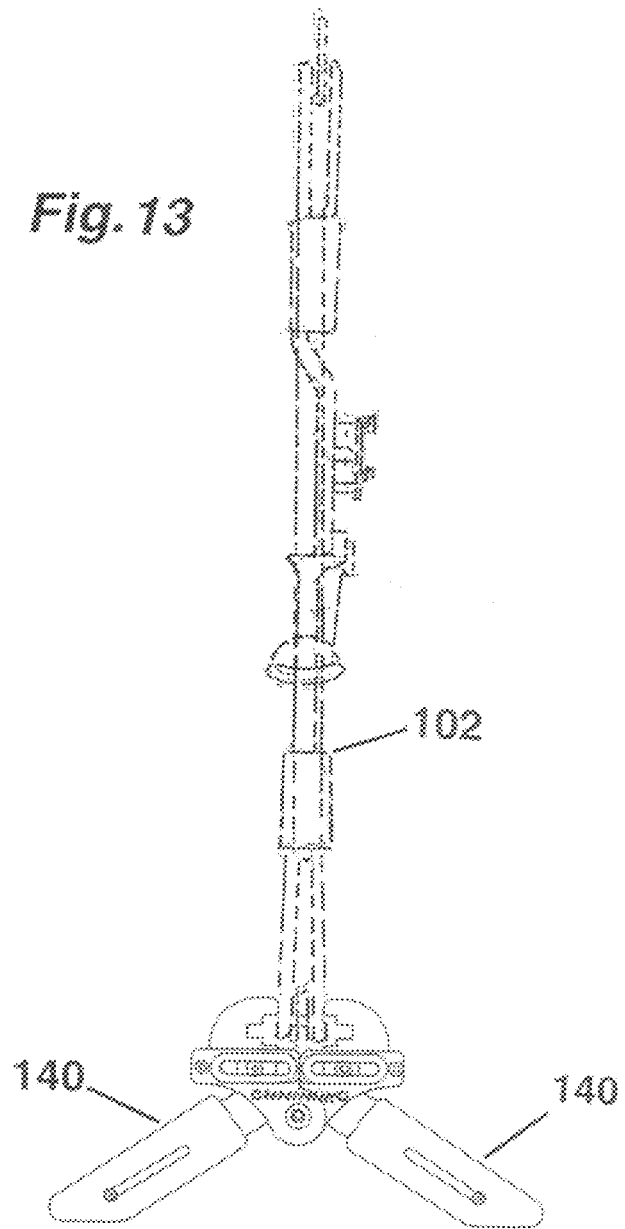

ARCHERY BOW SUPPORT

This invention relates to an archery bow support and, more particularly, to an archery bow support, which provides support for the bow when the bow is not in use.

BACKGROUND OF THE INVENTION

Archery is one of the oldest arts known to man. While it is believed that archery dates from the Stone Age, that is around 20,000 B.C., the Egyptian records from about 5,000 B.C. provide the first good evidence or records of archery and its many uses. While archery has a function for a person to use in hunting and the obtaining of food, archery can also be an effective weapon in warfare. Even tournaments are known to be based around the skill of an archer in hitting a target. Archery can even be a sport at the Olympics.

The manufacture of the archery bow and corresponding arrow provides exceptional information on the use of various materials to form both the bow and the arrow. From the simple wooden bow of the ancients, to the highly technical bow of the modern archer, much progress in the structure of the bow is known.

One of the difficulties in archery is the positioning of the archery bow, when the bow is not in use. To hold the bow can be troublesome. To just put the bow down can cause problems with or damage to the bow. It is therefore important to have a good method of safely and properly positioning the bow when the bow is not in use. So resting of the archer by releasing a grip on the bow or putting the bow down during a period of heavy use for the bow is a problem.

Such positioning of the bow during a period of heavy use, when the bow is not in use; especially during hunting, target practice, or tournaments; becomes critical. The device to achieve that positioning must be small enough to be easily transported and strong enough to do the supporting. In this manner, the bow can stay clean and ready to use.

Equally critical is the ability of that device to be attachable to a wide variety of bows. The variety of archery bows make such a device difficult to obtain. If an archery bow support, capable of supporting a variety of bows can be developed, great advantages can be obtained.

SUMMARY OF THE INVENTION

Among the many objectives of this invention is the provision of an archery bow support, which fit onto different types of bows and permits the archery bow support to be positioned on the bow with minimal chance of damage to the bow.

A further objective of this invention is the provision of an archery bow support, which has an adjustable or movable jaw for holding a bow.

Yet a further objective of this invention is the provision of an archery bow support, which is easily attached to a bow.

A still further objective of this invention is the provision of an archery bow support, which is easily released from a bow.

Another objective of this invention is the provision of an archery bow support, which has adjustable legs.

Yet another objective of this invention is the provision of an archery bow support, which is adjustable to fit different types of bows.

Still, another objective of this invention is the provision of an archery bow support, which simplifies positioning of the bow.

Also, an objective of this invention is the provision of an archery bow support, which minimizes a chance of damage to the bow.

A further objective of this invention is a releasable connection of an archery bow support to a bow, which protects the bow, when it is not in use.

These and other objectives of the invention (which other objectives become clear by consideration of the specification, claims and drawings as a whole) are met by providing an archery bow support, which adjusts, especially in the legs and the jaws of the archery bow support to fit a bow for positioning the bow during a downtime during a period of heavy use for the bow.

BRIEF DESCRIPTION OF THE DRAWINGS

FIG. 7 depicts a top plan view for archery bow support 100 of this invention based on FIG. 5.

FIG. 8 depicts a bottom plan view for archery bow support 100 of this invention as a reverse view of FIG. 7.

FIG. 9 depicts a side view for archery bow support 100 of this invention based on FIG. 5.

FIG. 10 depicts a side view for archery bow support 100 of this invention as a reverse view of FIG. 9.

FIG. 11 front, plan view for archery bow support 100 of this invention, showing its adjustability.

FIG. 13 depicts a front, plan view of an archery bow support 100 of this invention supporting bow 102.

Throughout the figures of the drawings, where the same part appears in more than one figure of the drawings, the same number is applied thereto.

DESCRIPTION OF THE PREFERRED EMBODIMENTS

Figure 1:
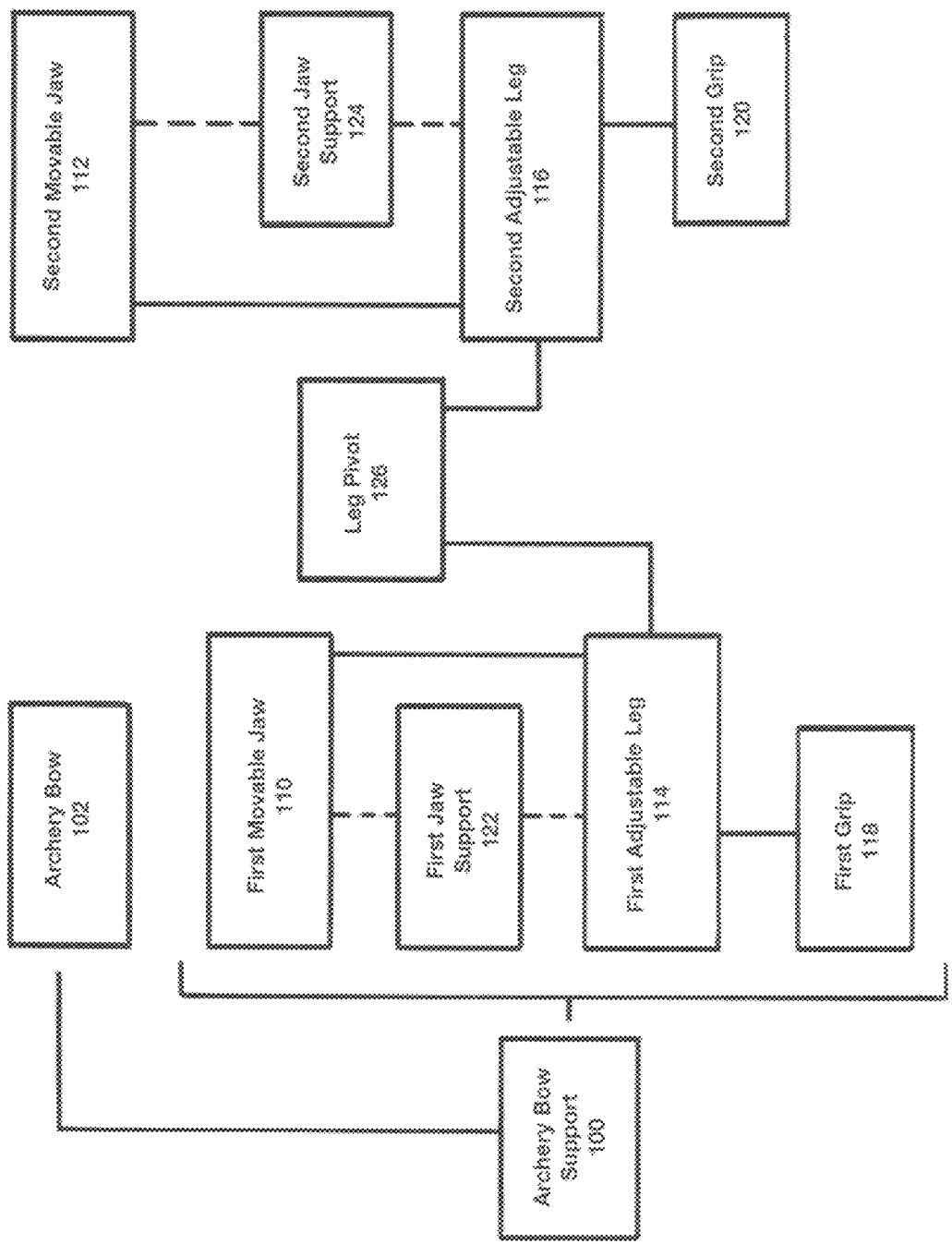
FIG. 1 depicts a box diagram of an archery bow support 100 of this invention in use on a bow 102.
Figure 2:
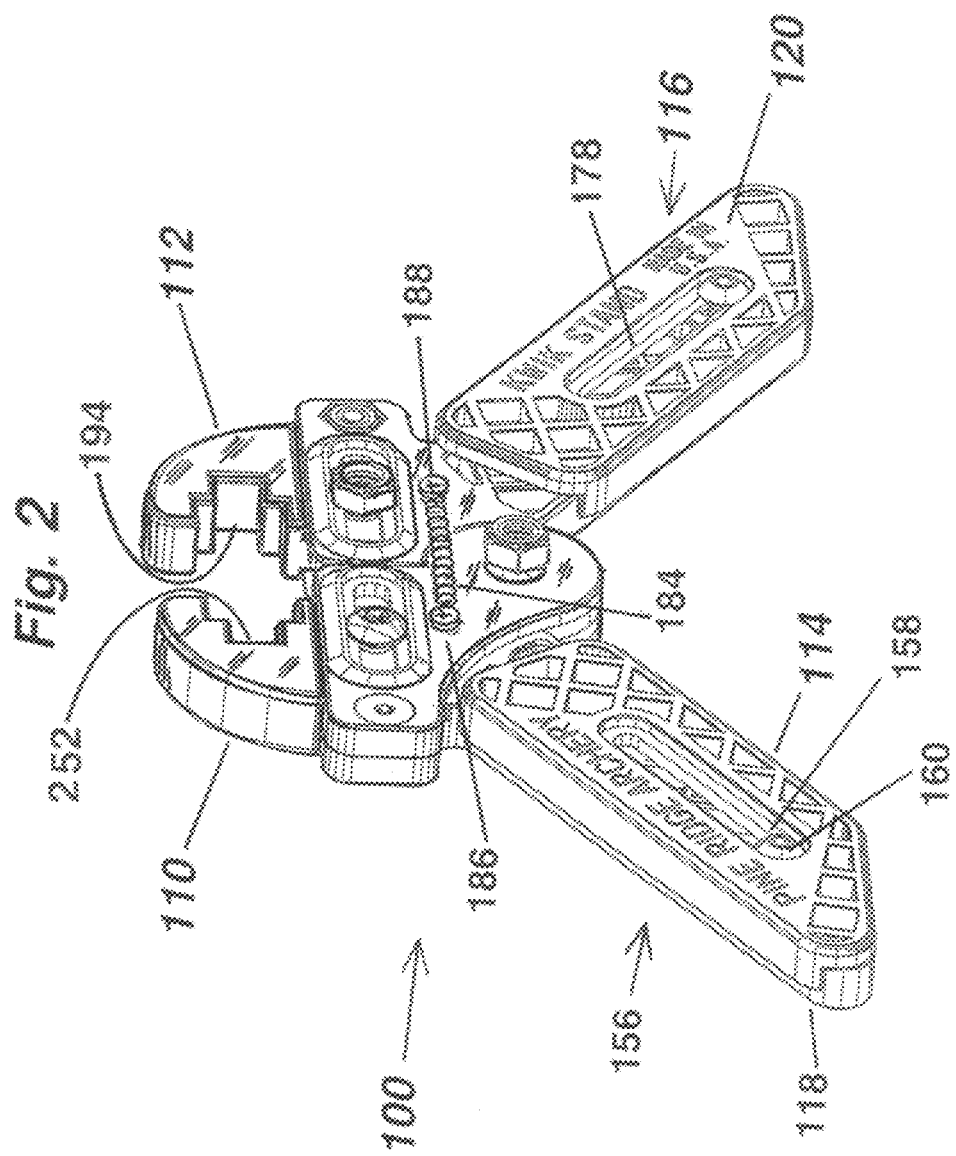
FIG. 2 depicts a front, perspective view of archery bow support 100 of this invention.
Figure 3:
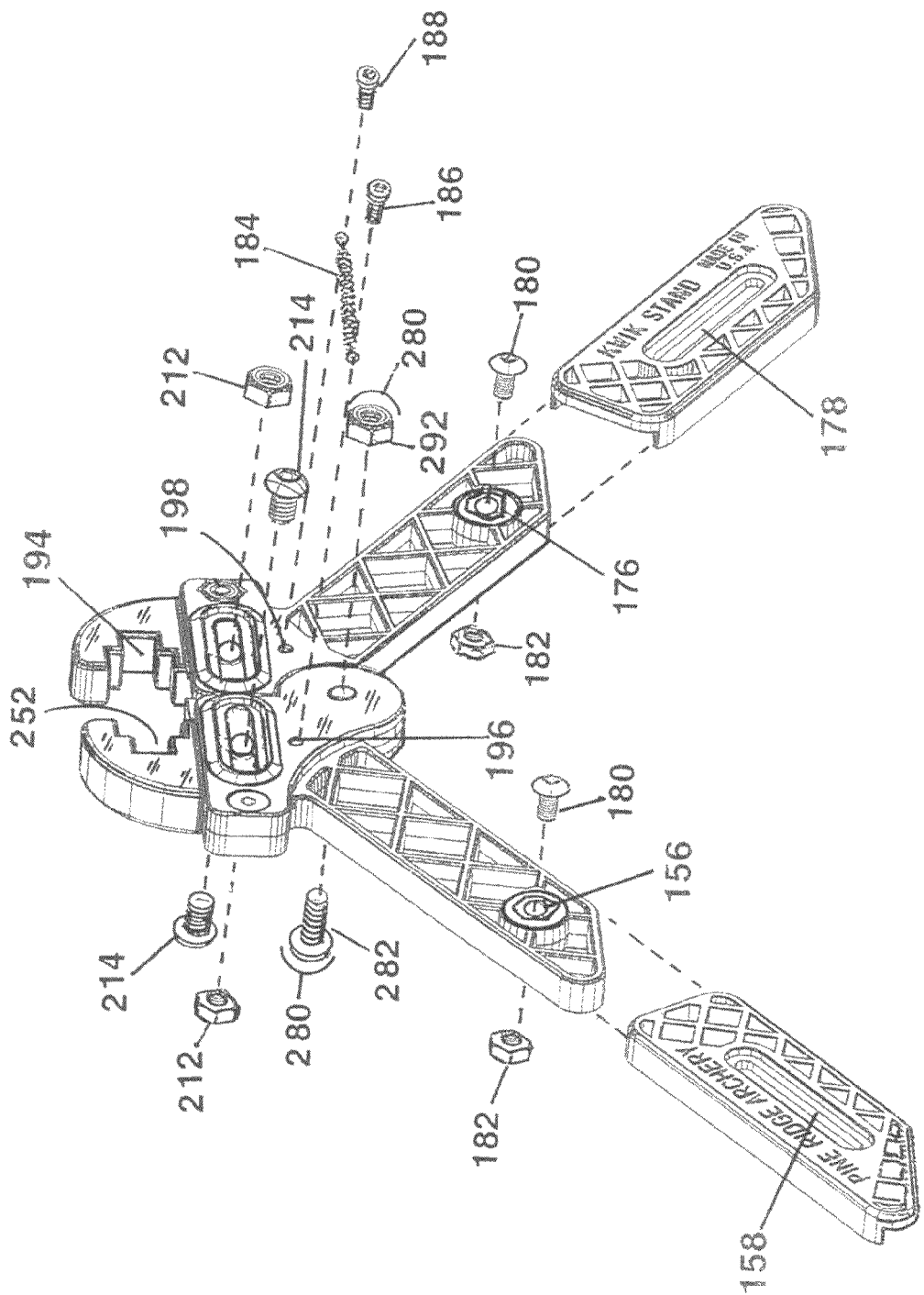
FIG. 3 depicts a partially exploded front, perspective view of archery bow support 100 of this invention, based on FIG. 2.
Figure 4:
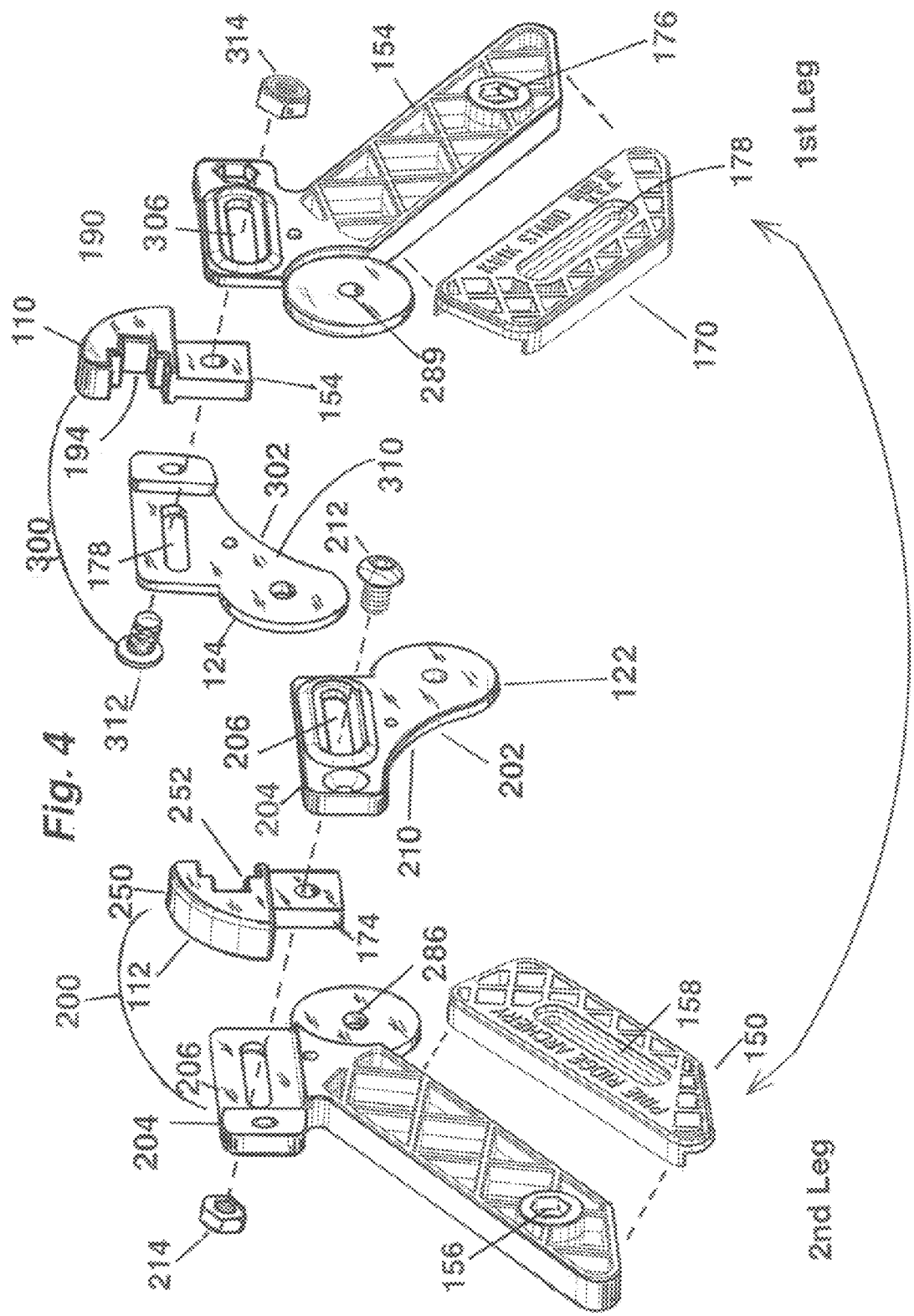
FIG. 4 depicts an exploded front, perspective view of archery bow support 100 of this invention, based on FIG. 2.

In accordance with the present invention, the archery bow support is depicted. The archery bow support has adjustable legs, and adjustable or movable jaws. The jaws are preferably made of hard rubber in order to eliminate, or at least minimize damage to an archery bow contained between the jaws. With the movable jaws, the archery bow support can fit onto a bow in order to position the bow in standing position as there as a temporary release of the bow from an archer, when there is a downtime during a period of heavy use for the bow, thereby permitting the archer to rest. Typical periods of heavy use are hunting with a bow and archery tournaments.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, down, over, above, below, beneath, rear, and front, may be used with respect to the drawings. These and similar directional terms are not to be construed to limit the scope of the invention in any manner. The words attach, connect, couple, and similar terms with their inflectional morphemes do not necessarily denote direct or intermediate connections, but may also include connections through mediate elements or devices.

Considering first FIG. 1, archery bow support 100 is releasably secured to archery bow 102. Archery bow support includes a first movable jaw 110 mounted on a first adjustable leg 114 along with a second movable jaw 112 mounted on a second adjustable leg 116. First adjustable leg 114 includes a first grip 118 which is slidably mounted on first adjustable leg 114. By the same token, second grip 120 is slidably mounted on second adjustable leg 116.

If desired, a first jaw support 122 may be inserted between first movable jaw 110 and first adjustable leg 114. With a similar structure, second jaw support 124 may be inserted between second movable jaw 112 and second adjustable leg 116. First movable jaw 110 and second movable jaw 112 are preferably made of hard rubber to eliminate damage by the jaws 110 and 112 on the bow 102.

Leg pivot 126 connects first adjustable leg 114 to second adjustable leg 116. Since first adjustable leg 114 and second adjustable leg 116 pivot about leg pivot 126, first movable jaw 110 can be moved toward second movable jaw 112 to grip archery bow 102. By the same token, first movable jaw 110 can be moved away from second movable jaw 112 to release a grip on archery bow 102.

Now considering FIG. 2, FIG. 3, FIG. 4, and FIG. 6; the structure of archery bow support 100 becomes even clearer. Leg pivot 126 includes a pivot assembly 280. Pivot assembly 280 includes a pivot bolt 282, which passes sequentially through first leg pivot 284, first lower plate 202, second lower plate 302 and second leg pivot 286 to be secured by pivot nut 292.

First leg or first slotted leg 150 and second leg or second slotted leg 170 are mounted on leg pivot 126 and are also similar in structure. First slotted leg 150 has first grip 152 mounted on first jaw brace 154.

Figure 5:
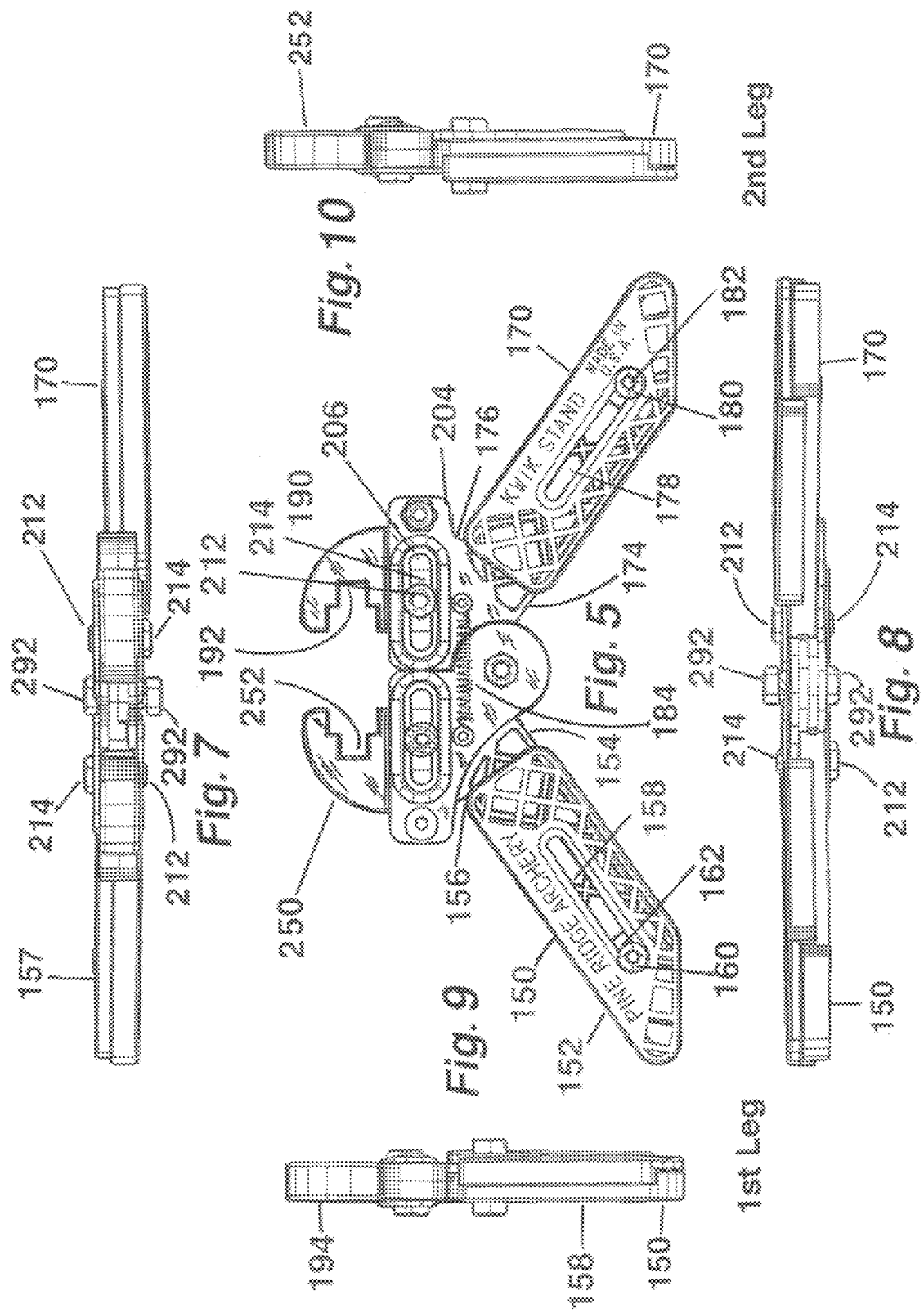
FIG. 5 depicts a front, plan view for archery bow support 100 of this invention.
Figure 6:
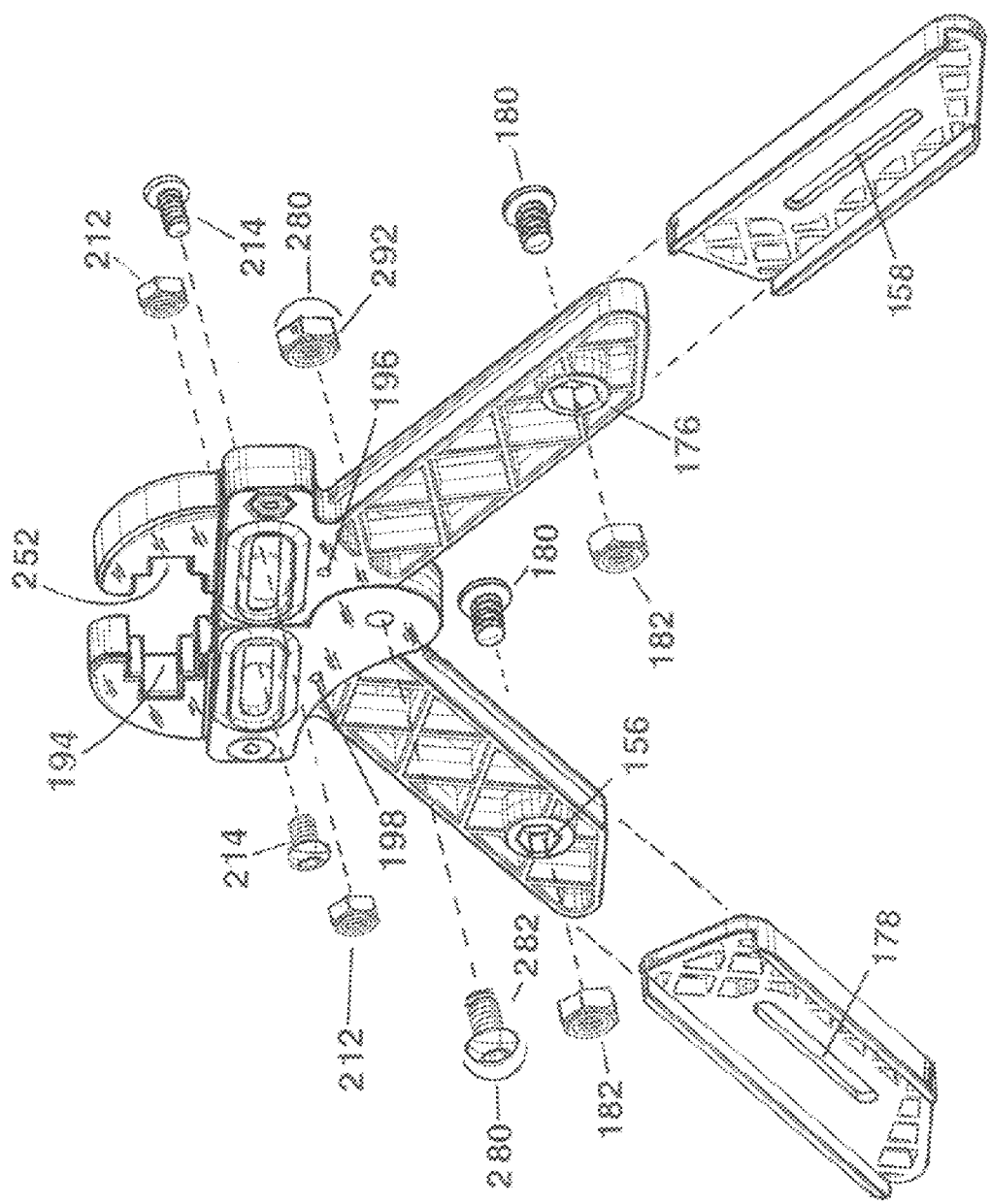
FIG. 6 depicts a reverse, perspective view of archery bow support 100 of this invention, based on FIG. 3.

Adding FIG. 5 and FIG. 6 to the consideration, the archery bow support 100 can receive an archery bow 102. For the archery bow support 100, a first movable jaw 110 is mounted on a first adjustable leg 114, while a second movable jaw 112 is mounted on a second adjustable leg 116.

First adjustable leg 114 is movably secured to second adjustable leg 116 by leg pivot 126. First adjustable leg 114 extends into first grip 118. Second adjustable leg 116 extends into second grip 120. First grip 118 and second grip 120 cooperate to permit use of the archery bow support 100.

First jaw support 122 can be used, if desired, to connect first movable jaw 110 to first adjustable leg 114. In a like manner, second jaw support 124 can be used to connect second movable jaw 112 to second adjustable leg 116.

Referring now to FIG. 5, FIG. 6, FIG. 7, FIG. 8, FIG. 9, FIG. 10, and FIG. 11; the structure of a desired embodiment for archery bow support 100 can be clearly seen. Archery bow support 100 has a generally flattened shape with a first slotted leg 150 and a second slotted leg 170. Mounted on first slotted leg 150 is first slidable jaw 190. Mounted on second slotted leg 170 is second slidable jaw 250. Both first slotted leg 150 and second slotted leg 170 are similar in structure.

First slotted leg 150 has a first grip 152 with a first jaw brace 154 slidably mounted therein through first receiving slot 156. First slotted leg 150 includes a first slide slot 158. First slide slot 158 permits first slotted leg 150 to receive first jaw brace 154. First jaw brace 154 is one embodiment of first jaw support 122. Extending from and secured to first jaw brace 154 is first leg bolt 160. First leg bolt 160 protrudes through first slide slot 158 and receives first leg nut 162 in threaded relation therewith. First leg nut 162 permits releasably locking first grip 152 relative to first jaw brace 154. In this fashion, first slotted leg 150 may have its length releasably adjustable.

Second slotted leg 170 has a second grip 172 with a second jaw brace 174 slidably mounted therein through second receiving slot 176. Second slotted leg 170 includes a second slide slot 178. Extending from and secured to second jaw brace 174 is second leg bolt 180. Second leg bolt 180 protrudes through second slide slot 178 and receives second leg nut 182 in threaded relation therewith. Second leg nut 182 permits releasably locking second grip 172 relative to second jaw brace 174. Second jaw brace 174 is one embodiment of second jaw support 124. In this fashion, second slotted leg 170 may have its length releasably adjustable.

First jaw brace 154 is connected to second jaw brace 174 with spring 184. First screw 186 is positioned over first jaw brace 154 and passes through spring 184 into first screw aperture 196 situated in first jaw brace 154. In the same manner, second screw 188 passes through spring 184 into second screw aperture 198 and second jaw brace 174. First screw 186 and second screw 188 oppositely disposed from each other in their contact with spring 184. Spring 184 serves to close or move first movable jaw 110 to second movable jaw 112.

First slidable jaw 190 is similar in shape to second slidable jaw 250. First slidable jaw 190 is positioned over second slotted leg 170. Second slidable jaw 250 is positioned over first slidable leg 150. First slidable jaw 190 has a first bow receiving surface 194. Second slidable jaw 250 has a second bow receiving surface 252. First bow receiving surface 194 and second bow receiving surface 252 cooperate to hold bow 102 (FIG. 11) in a desired position as bow 102 serves as the third leg of a tripod with first slotted leg 150 and second slotted leg 170 forming the other two legs thereof.

Connecting first slidable jaw 190 to first slotted leg 150 and second slotted leg 170 is first clamp assembly 200. First clamp assembly 200 includes a first lower plate 202 and a first upper plate 204. First upper plate 204 includes an upper plate slot 206. First slidable jaw 190 includes a first lower clamp insert 210 below first bow receiving surface 194. Protruding upwardly from first lower clamp insert 210 is first clamp bolt 212. First clamp bolt 212 protrudes through upper plate slot 206 and receives first clamp nut 214. Between first clamp bolt 212 and first clamp nut 214, the first slidable jaw 190 can adjust.

Connecting second slidable jaw 250 to first slotted leg 150 and second slotted leg 170 is second clamp assembly 300. Second clamp assembly 300 includes a second lower plate 302 and a second upper plate 304. Second upper plate 304 includes a second upper plate slot 306. Second lower plate 302 includes a second lower clamp insert 310 below second bow receiving surface 252. Protruding upwardly from second lower clamp insert 310 is second clamp bolt 312. Second clamp bolt 312 protrudes through second upper plate slot 306 and receives second clamp nut 314. Between second clamp bolt 312 and second clamp nut 314, the second slidable jaw 250 can adjust to a bow 102 (FIG. 12 or FIG. 13) being secured therein.

Pivot assembly 280 connects first jaw brace 154 and second jaw brace 174 together, while permitting first slotted leg 150 and second slotted leg 170 to rotate about pivot assembly 280. As that rotation occurs, second slidable jaw 250 moves relative to first slidable jaw 190. First jaw brace 154 includes a first jaw aperture 288. Second jaw brace 174 includes a second jaw aperture 290. Pivot assembly 280 includes a pivot bolt 282, which passes through both first jaw aperture 288 and second jaw aperture 290, and is secured therein by pivot nut 292. First jaw aperture 288 appears in first jaw pivot 294, while second jaw aperture 290 appears in second jaw pivot 296.

Figure 12:
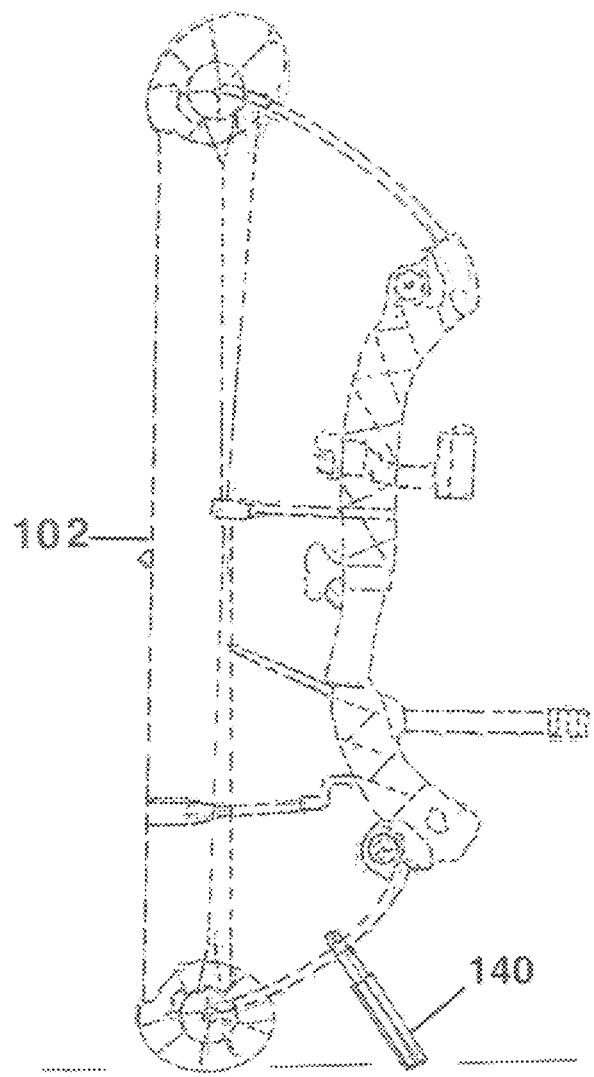
FIG. 12 depicts a side view of an archery bow support 100 of this invention supporting bow 102.

With FIG. 12 and FIG. 13 added to the consideration, archery bow support 100 can support a variety of bows 102. First clamp bolt 212 permits first bow receiving surface 194 to slide relative to second bow receiving surface 252. Second clamp bolt 312 permits second bow receiving surface 252 to slide relative to first bow receiving surface 194. This structure permits the archery bow support 100 to receive a variety of bows 102, thereby rendering the same useful to support a plurality of different size bow, one by one at a desired time.

This application—taken as a whole with the abstract, specification, claims, and drawings being combined—provides sufficient information for a person having ordinary skill in the art to practice the invention as disclosed and claimed herein. Any measures necessary to practice this invention are well within the skill of a person having ordinary skill in this art after that person has made a careful study of this disclosure.

Because of this disclosure and solely because of this disclosure, modification of this method and device can become clear to a person having ordinary skill in this particular art. Such modifications are clearly covered by this disclosure.

What is claimed and sought to be protected by Letters Patent of the United States is:

1. An archery bow support comprising:
   a first movable jaw, a second movable jaw, a first adjustable leg, and second adjustable leg cooperating to releasably attach the archery bow support to a bow;
   the first movable jaw being mounted on the first adjustable leg;
   the second movable jaw being mounted on the second, adjustable leg;
   the first adjustable leg having a first grip;
   the first grip being slidably mounted on the first adjustable leg;
   the second grip being slidably mounted on the second adjustable leg;
   the archery bow support having a generally flattened shape;
   a first slotted leg and a second slotted leg cooperating to provide a gripping area for the archery bow support;
   a first slidable jaw being mounted on the first slotted leg;
   a second slidable jaw being mounted on the second slotted leg;
   the first slotted leg and the second slotted leg being similar in structure;
   the first slotted leg having a first grip with a first jaw brace slidably mounted therein through a first receiving slot;
   the first slotted leg including a first slide slot;
   the first slide slot permitting first slotted leg to receive first jaw brace;
   the second slotted leg having a second grip with a second jaw brace slidably mounted therein through a second receiving slot;
   the second slotted leg including a second slide slot;
   the second slide slot permitting second slotted leg to receive second jaw brace;
   a first leg bolt extending from and being secured to a first jaw brace;
   the first leg bolt protruding through the first slide slot and receiving a first leg nut in threaded relation therewith;
   the first leg nut permitting a releasable locking of the first grip relative to the first jaw brace, in order to permit the first slotted leg to have a first releasably adjustable length;
   a second leg bolt extending from and being secured to a second jaw brace;
   the second leg bolt protruding through the second slide slot and receiving a second leg nut in threaded relation therewith;
   the first jaw and the second jaw being made of hard rubber to eliminate damage to the bow from the archery bow support;
   the second leg nut permitting a releasable locking of the second grip relative to the second jaw brace, in order to permit the second slotted leg to have a second releasably adjustable length;
   the first jaw brace being connected to the second jaw brace with a spring;
   a first screw being positioned over the first jaw brace and passing through a first end of the spring into a first screw aperture situated in the first jaw brace;
   a second screw being positioned over the second jaw brace and passing through a second end of the spring into a second screw aperture situated in the second jaw brace;
   the first movable jaw including a first slidable jaw;
   the second movable jaw including a second slidable jaw; and
   the first slidable jaw being similar in shape to the second slidable jaw.

2. The archery bow support of claim 1 further comprising;
   the first slidable jaw being positioned over second slotted leg;
   the second slidable jaw being positioned over first slidable jaw leg;
   the first slidable jaw having a first bow receiving surface;
   the second slidable jaw having a second bow receiving surface; and
   the first bow receiving surface and the second bow receiving surface cooperating to hold a bow in a desired position, wherein the bow serves as ae third leg of a tripod with the first slotted leg and the second slotted leg forming the other two legs of the tripod.

3. The archery bow support of claim 2 further comprising;
   a first clamp assembly connecting the first slidable jaw to the first slotted leg and the second slotted leg;
   the first clamp assembly including a first lower plate and a first upper plate;
   the first upper plate includes an first upper plate slot;
   the first slidable jaw including a first lower clamp insert below the first bow receiving surface;
   a first clamp bolt protruding upwardly from the first lower clamp insert;
   the first clamp bolt protruding through the first upper plate slot and receiving the first clamp nut;
   the first clamp bolt and the first clamp nut cooperating to render the first slidable jaw;

a second clamp assembly connecting the second slidable jaw to the first slotted leg and the second slotted leg;
the second clamp assembly including a second lower plate and a second upper plate;
the second upper plate includes an second upper plate slot;
the second slidable jaw including a second lower clamp insert below the second bow receiving surface;
a second clamp bolt protruding upwardly from the second lower clamp insert;
the second clamp bolt protruding through the second upper plate slot and receiving the second clamp nut;
the second clamp bolt and the second clamp nut cooperating to render the first slidable jaw; and
the second clamp assembly and the first clamp assembly being similar in structure.

4. The archery bow support of claim 3 further comprising:
a pivot assembly connecting the first jaw brace to the second jaw brace, while permitting the first slotted leg and the second slotted leg to at least partially rotate about the pivot assembly in order to move the second slidable jaw relative to the first slidable jaw;
the first jaw brace including a first jaw aperture;
the second jaw brace including a second jaw aperture;
the pivot assembly including a pivot bolt
the pivot bolt passing through both the first jaw aperture and the second jaw aperture, and being secured therein by a pivot nut;
the first jaw aperture appearing in a first jaw pivot; and
the second jaw aperture appearing in the second jaw pivot.

5. The archery bow support of claim 4 further comprising:
the archery bow support supporting a variety of bows;
the first clamp bolt permitting the first bow receiving surface to slide relative to the second bow receiving surface;
the second clamp bolt permitting the second bow receiving surface to slide relative to first bow receiving surface; and
the archery bow support being releasably secured to a desired bow at a desired time.

6. In a device for temporarily supporting an archery bow to rest an archer during a period of heavy use for the archery bow, the improvement comprising:
an archery bow support being capable of holding the archery bow in an upright position;
the archery bow support comprising a first movable jaw, a second movable jaw, a first adjustable leg, and second adjustable lea cooperating to releasable attach the archery bow support to a bow;
the first movable jaw being mounted on the first adjustable leg;
the second movable jaw being mounted on the second adjustable leg; the first adjustable leg having a first grip;
the first grip being slidably mounted on the first adjustable leg;
the second grip being slidably mounted on the second adjustable leg;
a first jaw support being inserted between the first movable jaw and the first adjustable leg;
a second jaw support being inserted between the second movable jaw and the first adjustable leg;
a leg pivot connecting the first adjustable leg to the second adjustable leg;
the first adjustable leg and the second adjustable leg being joined by and movable about the leg pivot thereby allowing the first movable jaw to have a jaw movement relative to the second movable jaw;
the jaw movement being adapted to release or grip an archery bow as desired;
the leg pivot including a pivot assembly;
the pivot assembly including a pivot bolt;
the pivot bolt passing sequentially through a first leg pivot, a first lower plate, second lower plate and second leg pivot;
the pivot bolt being secured therein by a pivot nut;
a first slotted leg and a second slotted leg being mounted on the leg pivot and being similar in structure;
the first jaw and the second jaw being made of hard rubber to eliminate damage to the bow from the archery bow support;
the first slotted leg having the first grip mounted on the first jaw brace;
the second slotted leg having the second grip mounted on the second jaw brace;
the archery bow support being adapted to receive an archery bow;
the first movable jaw being supported by a first adjustable leg;
the second movable jaw being supported by a second adjustable leg;
the first adjustable leg being movably secured to the second adjustable leg by the leg pivot;
the first adjustable leg extending into a first grip;
the second adjustable leg extending into a second grip;
a first jaw support connecting the first movable jaw to the first adjustable leg;
a second jaw support connecting the second movable jaw to the second adjustable leg
the first grin and the second grip cooperating to permit use of the archery bow support;
the first grip and the second grip being movable to provide adjustability for the first adjustable leg and the second adjustable leg;
the archery bow support having a generally flattened shape;
a first slotted leg and a second slotted leg cooperating to provide a gripping area for the archery bow support;
a first slidable jaw being mounted on the first slotted leg;
a second slidable jaw being mounted on the second slotted leg;
the first slotted leg and the second slotted leg being similar in structure;
the first slotted leg having a first grip with a first jaw brace slidably mounted therein through a first receiving slot;
the first slotted lea including a first elide slot;
the first slide slot permitting first slotted leg to receive first jaw brace;
the second slotted leg having a second grip with a second jaw brace slidably mounted therein through a second receiving slot;
the second slotted leg including a second slide slot;
the second slide slot permitting second slotted leg to receive second jaw brace;
a first leg bolt extending from and being secured to a first jaw brace;
the first leg bolt protruding through the first slide slot and receiving a first leg nut in threaded relation therewith;
the first leg nut permitting a releasable locking of the first crib relative to the first jaw brace, in order to permit the first slotted leg to have a first releasably adjustable length;

a second leg, bolt extending from and being secured to a second jaw brace;

the second leg bolt protruding through the second slide slot and receiving a second leg nut in threaded relation therewith;

the second leg nut permitting a releasable locking of the second grip relative to the second jaw brace, in order to permit the second slotted leg to have a second releasably adjustable length;

the first jaw brace being connected to the second jaw brace with a spring;

a first screw being positioned over the first jaw brace and passing through a first end of the spring into a first screw aperture situated in the first jaw brace;

a second screw being positioned over the second jaw brace and passing through a second end of the spring into a second screw aperture situated in the second jaw brace;

the first movable jaw including a first slidable jaw;

the second movable jaw including a second slidable jaw;

the first slidable jaw being similar in shape to the second slidable jaw;

the first slidable jaw being positioned over second slotted leg;

the second slidable jaw being positioned over first slidable jaw leg;

the first slidable jaw having a first bow receiving surface;

the second slidable jaw having a second bow receiving surface;

the first bow receiving surface and the second bow receiving surface cooperating to hold a bow in a desired position, wherein the bow serves as ae third leg of a tripod with the first slotted leg and the second allotted leg forming the other two legs of the tripod;

a first clamp assembly connecting the first slidable jaw to the first slotted leg and the second slotted leg;

the first clamp assembly including a first lower plate and a first upper plate;

the first upper plate includes an first upper plate slot;

the first slidable jaw including a first lower clamp insert below the first bow receiving surface;

a first clamp bolt protruding upwardly from the first lower clamp insert;

the first clamp bolt protruding through the first upper plate slot and receiving the first clamp nut;

the first clamp bolt and the first clamp nut cooperating to render the first slidable jaw;

a second clamp assembly connecting the second slidable jaw to the first slotted leg and the second slotted leg;

the second clamp assembly including a second lower plate and a second upper plate;

the second upper plate includes an second upper plate slot;

the second slidable jaw including a second lower clamp insert below the second bow receiving surface;

a second clamp bolt protruding upwardly from the second lower clamp insert;

the second clamp bolt protruding through the second upper plate slot and receiving the second clamp nut;

the second clamp bolt and the second clamp nut cooperating to render the first slidable jaw; and the second clamp assembly and the first clamp assembly being similar in structure.

7. The device of claim 6 further comprising:

a pivot assembly connecting the first jaw brace to the second jaw brace, while permitting the first slotted leg and the second slotted leg to at least partially rotate about the pivot assembly in order to move the second slidable jaw relative to the first slidable jaw;

the first jaw brace including a first jaw aperture;

the second jaw brace including a second jaw aperture;

the pivot assembly including a pivot bolt the pivot bolt passing through both the first jaw aperture and the second jaw aperture, and being secured therein by a pivot nut;

the first jaw aperture appearing in a first jaw pivot; and the second jaw aperture appearing in the second jaw pivot.

8. The device of claim 7 further comprising:

the archery bow support supporting a variety of bows;

the first clamp bolt permitting the first bow receiving surface to slide relative to the second bow receiving surface;

the second clamp bolt permitting the second bow receiving surface to slide relative to first bow receiving surface; and the archery bow support being releasably secured to a desired bow at a desired time.

\* \* \* \* \*